Patented Dec. 31, 1929

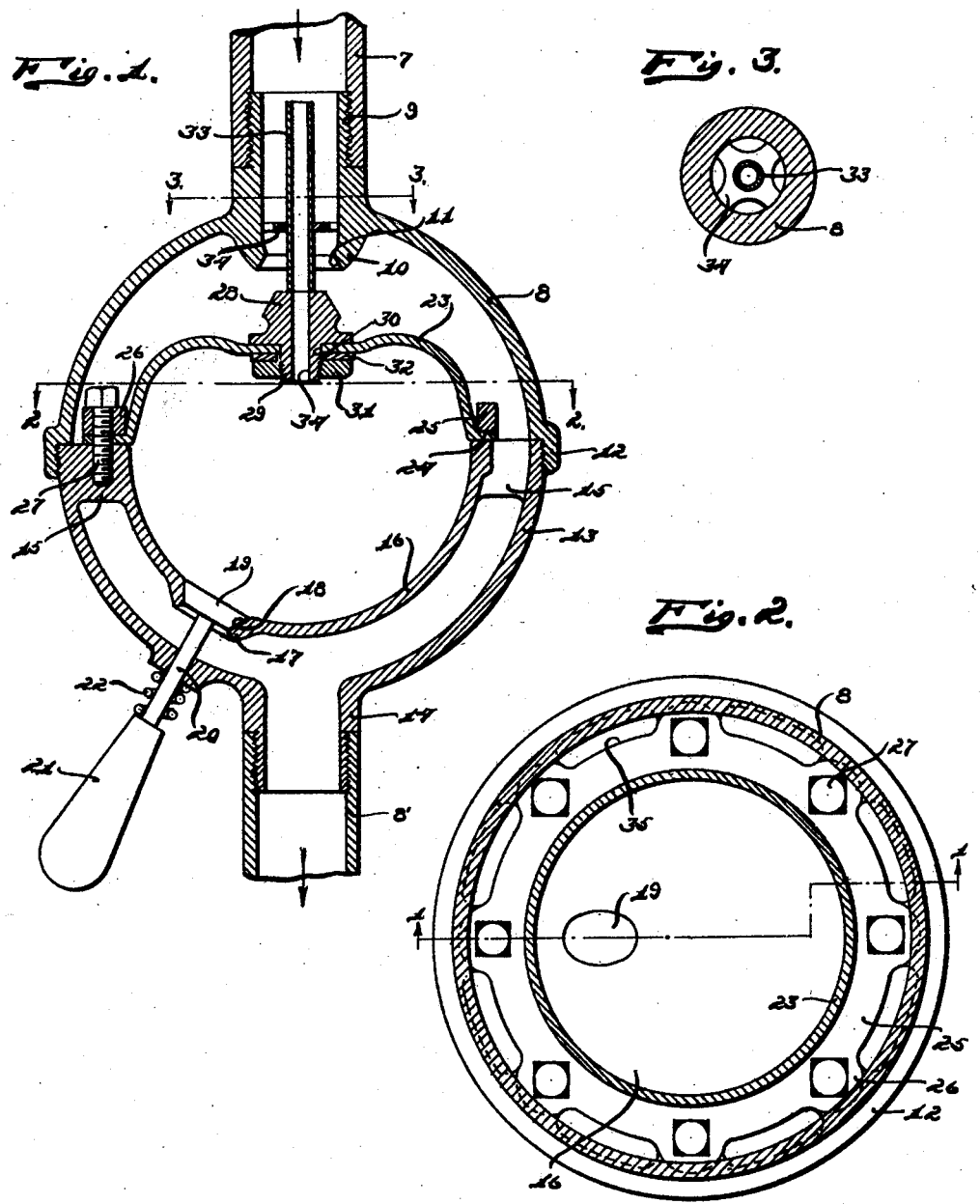

1,741,250

UNITED STATES PATENT OFFICE

FRITZ PROTZER, OF DETROIT, MICHIGAN

SELF-CLOSING VALVE

Application filed June 13, 1927. Serial No. 198,333.

My invention relates to a new and useful improvement in a self closing valve adapted for interposing in a fluid conductor for controlling the flow of fluid through the conductor.

It is especially useful in connection with the control of fluid in which the flow of the fluid at periodic intervals or short intervals is desired, such as in flushing closet bowls and the like. When used in connection with the flushing of closet bowls, the device has proven most efficient, supplying the necessary flow of water to the closet bowl to effect the desired siphonage, while at the same time, eliminating the noise incident to the flushing operation.

It is an object of the present invention to provide a self closing valve of this type which will attain the advantages mentioned and afford a valve which may be easily and quickly connected in position, easily operated and economically manufactured.

Another object is the provision of a valve of this class in which the various parts are reduced to a minimum, and the inoperativeness of the device resulting from wear or displacement of the various parts obviated.

Other objects will appear hereinafter.

The invention consists in the combination and arrangement of parts hereinafter described and claimed.

The invention will be best understood by a reference to the accompanying drawings which form a part of this specification and in which Fig. 1 is a central sectional view of the invention.

Fig. 2 is a view taken on line 2—2 of Fig. 1.

Fig. 3 is a view taken on line 3—3 of Fig. 1.

In the drawings the fluid conduit is illustrated by the pipes 7 and 8' through which the fluid is adapted to flow in the direction indicated by the arrows.

The invention comprises a semi-spherical body 8 made from suitable metal and provided with an outwardly projecting, exteriorly threaded neck 9 adapted for threading into the pipe 7. Projecting inwardly of the semi-spherical body 8 is a seat forming boss 10 having the valve seat 11 formed at its inner end. The edge of the semi-spherical body 8 is outwardly offset as at 12 and interiorly threaded for threading over the semi-spherical cooperating shell 13 also made preferably from metal, and provided with the outwardly projecting neck 14 which is exteriorly threaded for threading into the pipe 8'. Projecting inwardly from the edge of the shell 13 are ribs 15 which serve to connect and are preferably formed integral with the inwardly positioned semi-spherical shell 16 provided with the outwardly projecting bulge 17 in which is formed the valve seat 18, this valve seat being closed by the valve head 19, which carries the stem 20 projected through the shell 13, and upon which is mounted the handle 21, a coil spring 22 being positioned on the valve stem 20, as shown, for normally moving the valve head 19 into closing position, as shown in Fig. 1. Positioned interiorly of the semi-spherical body 8 is a flexible semi-spherical body 23 which serves as a valve closer and which is formed preferably from rubber or other suitable flexible material having the necessary resiliency. The edge 24 of this valve closer 23 is outwardly turned and engaged between a ring 25 and the edge of the inwardly positioned shell 16, this ring having enlargements 26 formed thereon in registration with the ribs 15, through which suitable screws 27 are projected and threaded into the ribs 15 so as to securely clamp the outwardly turned edge 24 of the valve closer 23 against the edge of the rib 16 and seal at this point the interior of the shell 16 from the interior of the semi-spherical body 8. Mounted axially of the valve closer 23 is a valve head 28 which is provided with the neck 29 projected through the opening 30 formed in the valve closer 23 and upon which is threaded the end 31 engaging the washer 32, so that the valve head 28 is securely fastened on the valve closer 23. Projecting upwardly from the valve head 28 is a pipe 33 which is in registration with the bore 34 formed through the valve head 28. This pipe 33 is slidably projected through a guide 34 formed in the neck 9.

In operation when the parts are in the position shown in Fig. 1 the fluid flowing inwardly through the pipe 7 will pass into the interior of the semi-spherical body 8 and through the spaces 35 into the space between the outer shell 13 and the inwardly positioned shell 16, and thence outwardly through the pipe 8'. At the same time a portion of the fluid will flow inwardly through the pipe 33 so as to gradually fill the chamber formed by the inner shell 16 and the valve closer 23, the valve head 19 being held in closed position by the spring 22. The closer 23 when in its normal position will retain the valve head 28 in engagement with the seat 11 and when the pressure inside the chamber formed by the inner shell 16 and the closer 23 becomes equal, or nearly equal, to the pressure on the fluid flowing inwardly through the pipe 7, the closer 23 will, because of its resiliency, move the head 28 into engagement with the seat 11, and thus the flow of the fluid through the pipe 8' terminated. To start the flow through the pipe 8' again, the valve head 19 may be moved inwardly from its seat 18, thus permitting the contents of the chamber formed by the inwardly positioned shell 16 and the closer 23 to flow outwardly through the opening. The pressure of the fluid in the pipe 7 will then force the closer 23 into the position shown in Fig. 1, and the inward pressure on the valve head 19 in the meanwhile having been released, the valve head 19 will move on to its seat 18 and the operation repeated.

I have found in practical operation that the pressure of the closer 23 on the head 28 will work satisfactorily with the ordinary city supply of water connected thereto, if the resiliency of this closer 23 is able to overcome the pressure of two atmospheres.

The semi-spherical body 8 and the semi-spherical shell 12 may be said to constitute together a single container, and the inwardly positioned semi-spherical shell 16, together with the closer 23, may be said to constitute a container positioned inwardly of the container made up from the parts 8 and 13.

With a valve constructed in this manner, an economical and efficient operation is provided in connection with the flushing of closet bowls and the advantages desired are obtained.

While I have illustrated and described the preferred form of my invention I do not wish to limit myself to the precise details of structure shown, but desire to avail myself of such variations and modifications as come within the scope of the appended claim.

Having thus described my invention what I claim as new and desire to secure by Letters Patent is:

A valve of the class described comprising: a substantially spherical container having a pair of metallic sections threaded together at their open ends, one of said sections having an inlet opening and the other having an outlet opening; a valve seat extended inwardly of said container at said inlet opening; a substantially semi-spherical rigid metallic shell positioned within said container and formed integral with the section having the outlet opening and spaced therefrom; a plurality of ribs connecting said section and said shell adjacent their open ends; a substantially semi-spherical flexible shell positioned within said container and engaging at its edges the edges of said rigid shell; a ring engaging the edges of said flexible shell and clamping the same against the edges of said rigid shell; threaded members projected through said ring and through the edges of said flexible shell and threaded into said ribs for retaining said ring in clamping position; a valve mounted on said flexible shell and adapted upon distension of said flexible shell for engaging in said seat and closing communication of said container with said inlet opening, said flexible shell and said rigid shell forming an inner container normally in communication with said inlet opening, said first-mentioned container being normally in communication with said outlet opening; and a valve operable from the exterior of said container for controlling communication of said inner positioned container with said outlet opening.

In testimony whereof I have signed the foregoing specification.

FRITZ PROTZER.